(12) United States Patent
Yadav

(10) Patent No.: US 6,855,426 B2
(45) Date of Patent: *Feb. 15, 2005

(54) METHODS FOR PRODUCING COMPOSITE NANOPARTICLES

(75) Inventor: Tapesh Yadav, Longmont, CO (US)

(73) Assignee: NanoProducts Corporation, Longmont, CO (US)

(*) Notice: Subject to any disclaimer, the term of this patent is extended or adjusted under 35 U.S.C. 154(b) by 214 days.

This patent is subject to a terminal disclaimer.

(21) Appl. No.: 10/143,995

(22) Filed: May 10, 2002

(65) Prior Publication Data

US 2003/0035955 A1 Feb. 20, 2003

Related U.S. Application Data

(63) Continuation-in-part of application No. 10/004,387, filed on Dec. 4, 2001, now Pat. No. 6,652,967.
(60) Provisional application No. 60/357,946, filed on Feb. 19, 2002, and provisional application No. 60/310,967, filed on Aug. 8, 2001.

(51) Int. Cl.$^7$ .................... B32B 18/00; B32B 1/10; B32B 15/00; B32B 15/04
(52) U.S. Cl. .............. 428/403; 428/323; 428/328; 428/329; 428/330; 428/331; 428/357; 428/402; 428/404; 428/325; 427/180; 427/201; 427/204; 427/205; 427/212; 427/215; 427/216
(58) Field of Search .................... 428/323, 325, 428/328, 329, 330, 331, 357, 402, 403, 404; 427/180, 201, 204, 205, 212, 215, 216

(56) References Cited

U.S. PATENT DOCUMENTS

| | | | | |
|---|---|---|---|---|
| 6,165,247 A | * | 12/2000 | Kodas et al. | 75/331 |
| 6,268,222 B1 | * | 7/2001 | Chandler et al. | 436/523 |
| 6,652,967 B2 | * | 11/2003 | Yadav et al. | 428/403 |
| 6,653,356 B2 | * | 11/2003 | Sherman | 516/90 |
| 6,680,279 B2 | * | 1/2004 | Cai et al. | 502/327 |

* cited by examiner

*Primary Examiner*—Vivian Chen
(74) *Attorney, Agent, or Firm*—Stuart T. Langley; Hogan & Hartson L.L.P.

(57) ABSTRACT

Size-confined nanocomposite powders and methods for their manufacture are provided by coating fine powders with a nanoscale powder of a different composition. The nanocomposite plastics disclosed offer performance characteristics approaching those of metals and alloys. The nanocomposite powders are alternatively used for dispersion strengthening of metals, alloys, and ceramics. Novel materials based nanotechnology for energy devices and programmable drug delivery are disclosed.

20 Claims, 2 Drawing Sheets

METHODS FOR PRODUCING COMPOSITE NANOPARTICLES

RELATED APPLICATIONS

The present invention claims priority to U.S. Provisional Application No. 60/357,946 filed on Feb. 19, 2002 entitled "POST-PROCESSED PARTICLES AND RELATED NANOTECHNOLOGY FOR SIGNIFICANTLY IMPROVED MATERIAL PERFORMANCE", the specification of which is incorporated herein by reference in its entirety. The present invention is also a continuation-in-part of co-owned U.S. patent application Ser. No. 10/004,387 entitled "NANO-DISPERSED POWDERS AND METHODS FOR THEIR MANUFACTURE" filed on Dec. 4, 2001, now U.S. Pat. No. 6,652,967 which is incorporated herein by reference in its entirety, and which claims priority to provisional application No. 60/310,967 filed Aug. 8, 2001.

BACKGROUND OF THE INVENTION

1. Field of the Invention

The present invention relates, in general, to use of nanotechnology, and, more particularly, methods to produce significantly improved material performance through the use of composite nanoparticles.

2. Relevant Background

Powders are used in numerous applications. They are the building blocks of electronic, telecommunication, electrical, magnetic, structural, optical, biomedical, chemical, thermal, and consumer goods. On-going market demands for smaller, faster, superior and more portable products have demanded miniaturization of numerous devices. This, in turn, demands miniaturization of the building blocks, i.e. the powders. Sub-micron and nano-engineered (or nanoscale, nanosize, ultrafine) powders, with a size 10 to 100 times smaller than conventional micron size powders, enable quality improvement and differentiation of product characteristics at scales currently unachievable by commercially available micron-sized powders.

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, are an extraordinary opportunity for design, development and commercialization of a wide range of devices and products for various applications. Furthermore, since they represent a whole new family of material precursors where conventional coarse-grain physiochemical mechanisms are not applicable, these materials offer unique combination of properties that can enable novel and multifunctional components of unmatched performance. Yadav et al. in a co-pending and commonly assigned U.S. patent application Ser. No. 09/638,977 which along with the references contained therein are hereby incorporated by reference in full, teach some applications of sub-micron and nanoscale powders.

It has been anticipated by those skilled in the art that size confinement could potentially produce materials with significantly improved strength, toughness, hardness, and other mechanical properties. However, size confinement has been difficult to reduce to commercial practice. The reasons for this failure, in part, include (a) current inability to retain the nanoscale grain size when nanoparticles are post-processed into a final commercial product, and (b) agglomeration and aggregation of nanoparticles that in turn produces defects and poor bonding at interfaces.

Yet another method of improving the mechanical performance of materials that is known to those in the art is to employ particles to dispersion strengthen materials. Dispersion strengthening is a method used to increase the strength and high temperature performance of metal alloys by incorporating a fine distribution of hard particulates within a load-bearing matrix. These materials are formed, for example, by mixing particles with a matrix material comprising the metal, metal alloy, or other material to be strengthened. This method takes advantage of the fact that dislocation motion is hindered by the presence of the fine particulate. It is expected that as nanoparticles replace microparticles in dispersion-strengthened materials, the performance of these materials will increase.

However, it has been difficult to use nanoscale particulates in commercial dispersion strengthening applications because of poor bonding at the matrix and the nanoparticle dispersant interface. The lack of an intimate, uniform bonding between the matrix and dispersant materials results in sub-optimal performance of the composite materials. Further, conventional techniques experience difficulty in achieving and maintaining a homogeneous distribution of the nanoparticles in the matrix.

In general, the commercial promise and social benefits of nanotechnology are currently limited by the difficulty in post-processing nanoparticles into nanotechnology products. There is a need for a technology that can address these post-processing limitations.

SUMMARY OF THE INVENTION

Briefly stated, the present invention involves the use of nanotechnology to produce composite nanoparticles, as well as new classes of materials from those composite nanoparticles. The invention addresses known issues with the use of nanoparticles and offers unusual methods for making novel materials useful in a wide range of applications. More specifically, the invention teaches method to create materials from plastics that can compete with metals and alloys in certain applications. The invention further teaches method to create materials from resins, ceramics, metals or alloys that are expected to dramatically improve the performance of the constituent materials they are fabricated from. Further, the invention discloses some illustrative applications and their commercial significance.

DETAILED DESCRIPTION OF THE PREFERRED EMBODIMENTS

Figure 1:
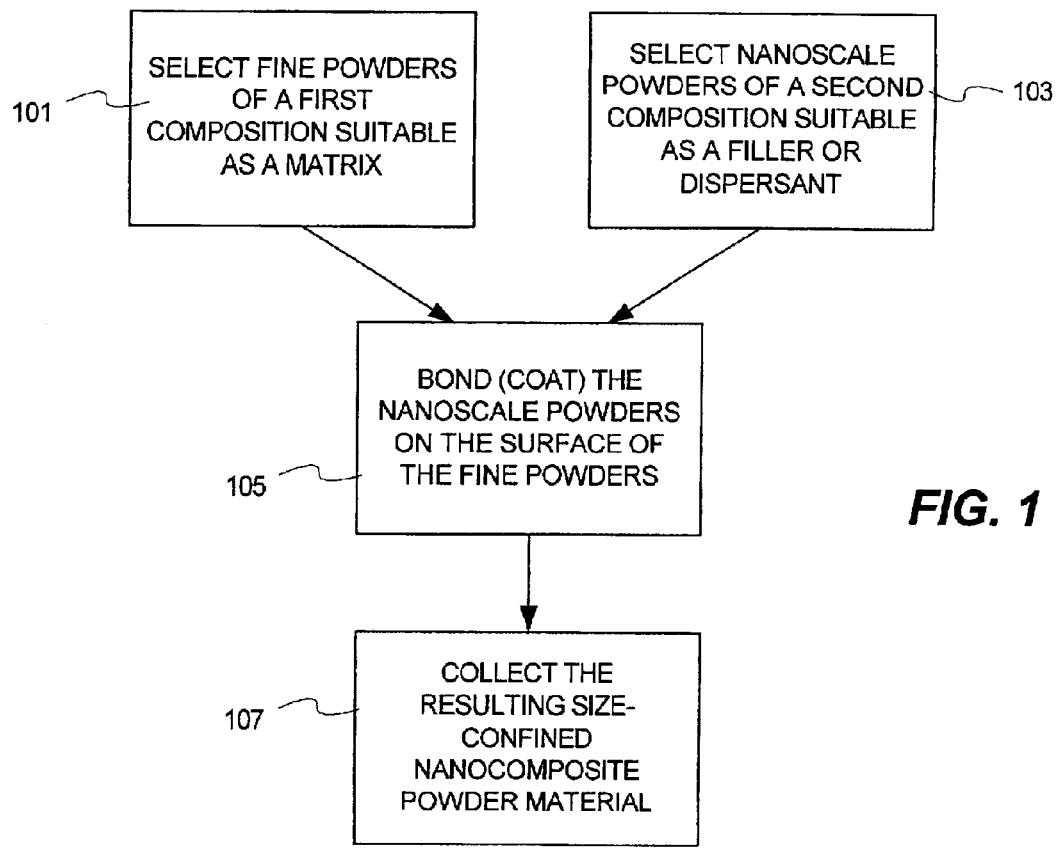
FIG. 1 shows an exemplary overall approach for producing unusual materials in accordance with the present invention.

This invention is generally directed to size-confined, interface-fused nanocomposite particles and products produced from such particles. Composite nanoparticles produced in accordance with the present invention comprise, for example fine powders in which nanoscale particles are bonded to the surfaces of nanoscale or micron scale particles of a matrix material. An important difference between other methods that merely teach coating of a powder with another substance, is that in present invention the nanoscale particles on the surface and the coated powder chemically bond and form a layer where the two compositions create a state synergistically reducing the free energies from the bonding. Thus, the coated nanocomposite particles taught herein are characterized by the composition of the powder coated, composition of the nanoparticles that form the coating, and the distinct composition of an interface that results from the bonding process and consequent reduction in the chemical potential. Therefore, unlike other techniques in the art that merely teach methods for forming coated powders, this invention teaches a novel composition of matter. Also, unlike prior approaches for forming composites materials, the present invention enables a high degree of control and flexibility in engineering the interface between the nanoparticle dispersant and the matrix material. Further, the resulting powder is uniform at a fine powder scale to that when the composite nanopowders are used to form materials, uniformity and homogeneity of the resulting material is readily controlled.

Definitions

For purposes of clarity the following definitions are provided to aid understanding of description and specific examples provided herein:

"Fine powders", as the term used herein, are powders that simultaneously satisfy the following:

1. particles with mean size less than 100 microns, preferably less than 10 microns, and
2. particles with aspect ratio between 1 and 1,000,000.

"Submicron powders", as the term used herein, are fine powders that simultaneously satisfy the following:

1. particles with mean size less than 1 micron, and
2. particles with aspect ratio between 1 and 1,000,000.

"Nanopowders" (or "nanosize powders" or "nanoscale powders" or "nanoparticles"), as the term used herein, are fine powders that simultaneously satisfy the following:

1. particles with mean size less than 250 nanometers, preferably less than 100 nanometers, and
2. particles with aspect ratio between 1 and 1,000,000.

"Pure powders," as the term used herein, are powders that have composition purity of at least 99.9%, preferably 99.99% by metal basis.

"Powder", as the term used herein encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric form or substance.

The present invention involves size confinement, and in particular involves size confinement through the use of nanoscale particles.

One feature of the present invention involves forming nanocomposite particles (also called nanocomposite powders) that are size-confined in that they retain useful properties associated with size confinement when placed in proximity with other matter as required by most useful applications.

It is known that the mechanical properties of materials can be improved by dispersion strengthening or hard working the materials to introduce interfaces where dislocations get pinned. The emergence of nanotechnology has led those in the art to theoretically suggest that materials having nanoscale dimensions could be used to form unusually superior performing materials, superior in strength, modulus, creep and other commercially useful characteristics. Despite the potential outlined by theory, in practice this has not been reduced to commercial use. In part, this failure is because it is very difficult to retain the nanoscale dimensions as nanoparticles are processed into final useful products. When used as dispersants, it is difficult to disperse the nanoparticles homogeneously in a matrix. Further, it is difficult to process the nanoparticles and a matrix to achieve intimate bonding at the interface; normally, defects or the presence of gases adsorbed onto the interfaces causes the bonding to be poor.

Conventional methods of forming a product from nanoparticles or forming a nano-dispersion strengthened material combines the process of forming the end product and interface engineering. That is, both the product manufacturing step and the interface-engineering step happen together, each affecting and often creating confounding interactions with the other. To be more specific, numerous products prepared from powders require sintering which normally is practiced at elevated temperatures. These elevated temperatures, unfortunately, also cause grain coarsening and the loss of nanoscale confinement. Similarly, dispersion of particulates in alloys is often done at elevated temperatures or in molten form of a metal or alloy. These processing conditions lead to phase segregation or poor distribution and bubbling out of the particles given that they have gases adsorbed at their interface.

It is also common to prepare mixtures of powders in advance of the manufacturing processes used to make a useful article. The prepared mixtures are packaged, stored, and handled in ways that affect the integrity of the powders. For example, separation of the mixture reduces homogeneity leading to variability in performance of the material in the manufacturing processes.

In accordance with the present invention, the product manufacturing operation(s) and the interface-engineering operation(s) are separated. The interface engineering is done first in operations shown in FIG. 1, and at processing conditions that prevent or limit the loss of size confinement effects. Next, the product manufacturing operations shown in FIG. 2 are conducted. Preferably, the nanocomposite powders produced in the interface engineering phase are suitably rugged to preserve size confinement effects during portions of the manufacturing operations shown in FIG. 2 in which size confinement effects are relevant, as well as any packaging, storage, and handling operations that occur between the interface engineering operations shown in FIG. 1 and the manufacturing operations shown in FIG. 2.

Figure 2:
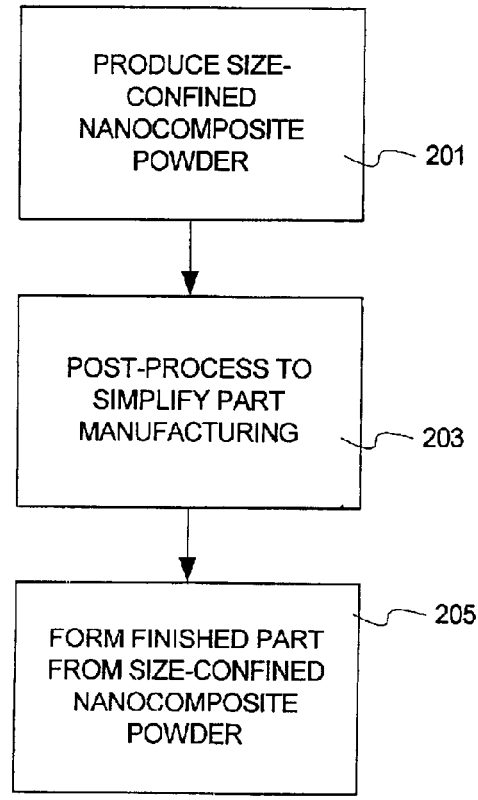
FIG. 2 shows an exemplary overall approach for producing a product from the unusual materials in accordance with the present invention.

As shown in FIG. 1, matrix powders comprising fine powders of a composition suitable for the desired matrix are selected in 101, where the fine powders may be nanoscale, micron scale, or in some cases larger. In 103, nanoscale powders of a second composition, different than the matrix material selected in 101, are selected. The composition of the material selected in 103 is selected to be suitable as a filler or dispersant in the desired composite.

In one embodiment, the nanoscale powders or submicron powders selected in 101 are coated in operation 105 with the powders selected in 103, preferably such that coating is significantly thinner than the composite powder size. On weight basis, it is preferred that the loading of coated nanoparticulate material be less than or equal to 40% by weight of the resultant nanocomposite powder, and more preferred to be less than 5% in some applications. In some applications, this loading can be as small as 0.25% to 2%, or lower than 0.25%, and in others it may be higher than 40% by weight. This coating can be done using techniques such as chemical vapor deposition, physical vapor deposition, monolayer reactive deposition, precipitation, condensation, selective and controlled reaction, infiltration, laser deposition, and those taught by commonly owned co-pending U.S. patent application Ser. No. 10/004,387 filed on Dec. 4, 2001 entitled "NANO-DISPERSED POWDERS AND METHODS FOR THEIR MANUFACTURE", the specification of which is incorporated herein by reference. The particles so produced can subsequently be processed into useful products. The presence of the coating prevents or limits the coarsening of the nanoparticles and the coated powder, and gives the manufacture greater control over the manner in which size confinement effects of the composite particles affect the properties of the useful article being produced.

In another embodiment, fine powders or submicron powders or nanoscale powders of first composition of material (selected in operation 101) are post-processed in operation 105 with nanoparticles of second composition selected in operation 103. The post-processing produces composite particles where the nanoparticles of second composition coat the powders of first composition. The coating bonds the interface between the first and the second composition. The coating performed in 105 can be complete, partial, dense, porous, monolayer, multi-layer, uniform or non-uniform. The composite particles so produced can then be collected in operation 107, and processed into useful products as suggested in FIG. 2.

The presence of the coating and interface bonding (a) prevents or limits the coarsening of the nanoparticles, and (b) helps retain the size confinement of the powders of first composition due the presence of the coating of second composition. For this embodiment, one or more of these methods can be employed to form the composite particles—cryogenic fusion, mechano-chemical fusion caused by various variations of milling, chemical vapor deposition, physical vapor deposition, reactive deposition, precipitation, condensation, selective and controlled reaction of surface, infiltration, laser deposition, and those taught by a commonly-pending U.S. patent application Ser. No. 10/004,387.

Examples of a first composition selected in 103 in a composite particle can be a polymer, metal, ceramic, alloy or a composite. The second composition can also be a polymer, metal, ceramic, alloy or a composite; however, for this invention the substance constituting the first composition is different in one or more way than the second composition.

Some non-limiting illustrations of a polymer useful as a first composition in 103 include polyethylene, polypropylene, polystyrene, polyurethane, polyacrylates, polycarbonates, polyamides, polyamines, polyimines, and any other carbon containing polymeric compound.

Some non-limiting illustrations of a ceramic useful as a first composition in 103 include oxides, carbides, nitrides, borides, chalcogenides, halides, silicides, and phosphides. Ceramics for this invention can be single metal compounds or multi-metal compounds. The composition selected in 103 may also comprise complex compositions such as oxycarbides, oxynitrides, carbonitrides, boro-nitrides, and non-stoichiometric compositions.

Some non-limiting illustrations of a metal useful in as a first composition in 103 include transition metals, alkali metals, alkaline earth metals, rare earth metals, and semi-metals. It is preferred that the metal be low cost and otherwise compatible with the processing and intended use for the metal. Some of the preferred metals for dispersion strengthening include those comprising copper, molybdenum, iron, nickel, and cobalt.

Some non-limiting illustrations of an alloy that can be prepared using the nanocomposite powders in accordance with this invention include alloys comprising two metals, alloys comprising three or more metals, alloys comprising metals and semimetal or nonmetal or both. Some of the preferred alloys for dispersion strengthening include those comprising steel, iron alloys, aluminum alloys, brass, bronze, nickel alloys, molybdenum alloys, titanium alloys, superalloys, and alloys comprising of rare earth elements.

Fine powders, submicron powders, and nanoparticles for this invention may be produced and processed by any method including those that have been discussed in commonly owned patents (U.S. Pat. Nos. 6,344,271, 6,228,904, 6,202,471, 5,984,997, 5,952,040, 5,905,000, 5,851,507, and 5,788,738) which along with the references cited therein are incorporated herein by reference.

The manufacturing processes shown in FIG. 2 generally involve producing, selecting or otherwise obtaining size-confined nanocomposite powders in operation 201, such as described in reference to FIG. 1. Optionally, the nanocomposite powders may be post-processed to simplify part manufacturing in 203. Post-processing operation 203 may involve any of a variety of processes such as thermal treatment, drying, chemical treatment, surface modification, de-agglomeration, agglomeration, reduction, oxidation, dispersion, static removal, and the like that have an impact on handling the nanocomposite powder during manufacture, or alter the nanocomposite powder's performance in the manufactured product. In operation 203, a finished or partially finished part is manufactured from the size-confined nanocomposite powder using techniques including injection molding, spray coating, pressing, hipping, tape casting, screen printing, mold stamping, ink-jet printing, melt processing, electrophoresis, and the like.

Figure 3:
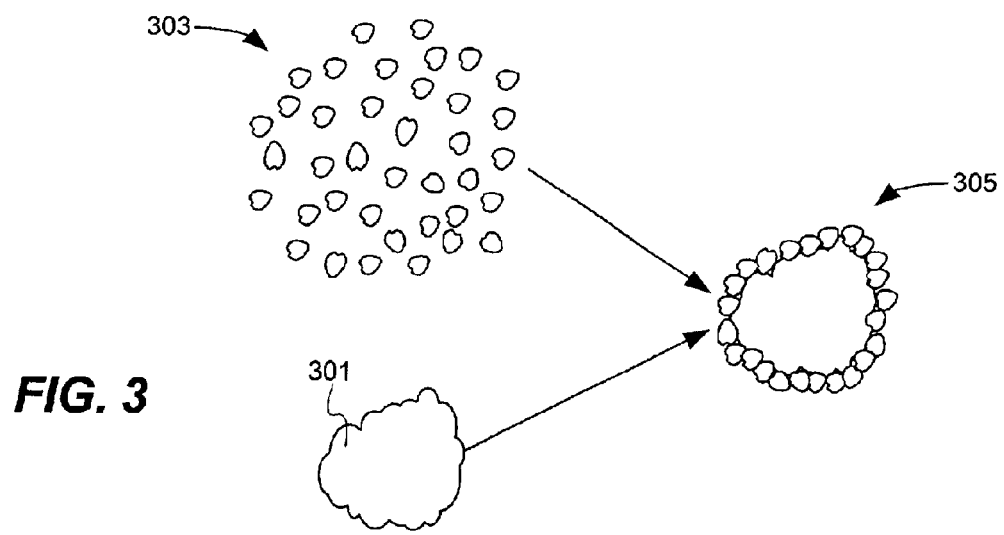
FIG. 3 illustrates and example of nanocomposite particle production.
Figure 4:
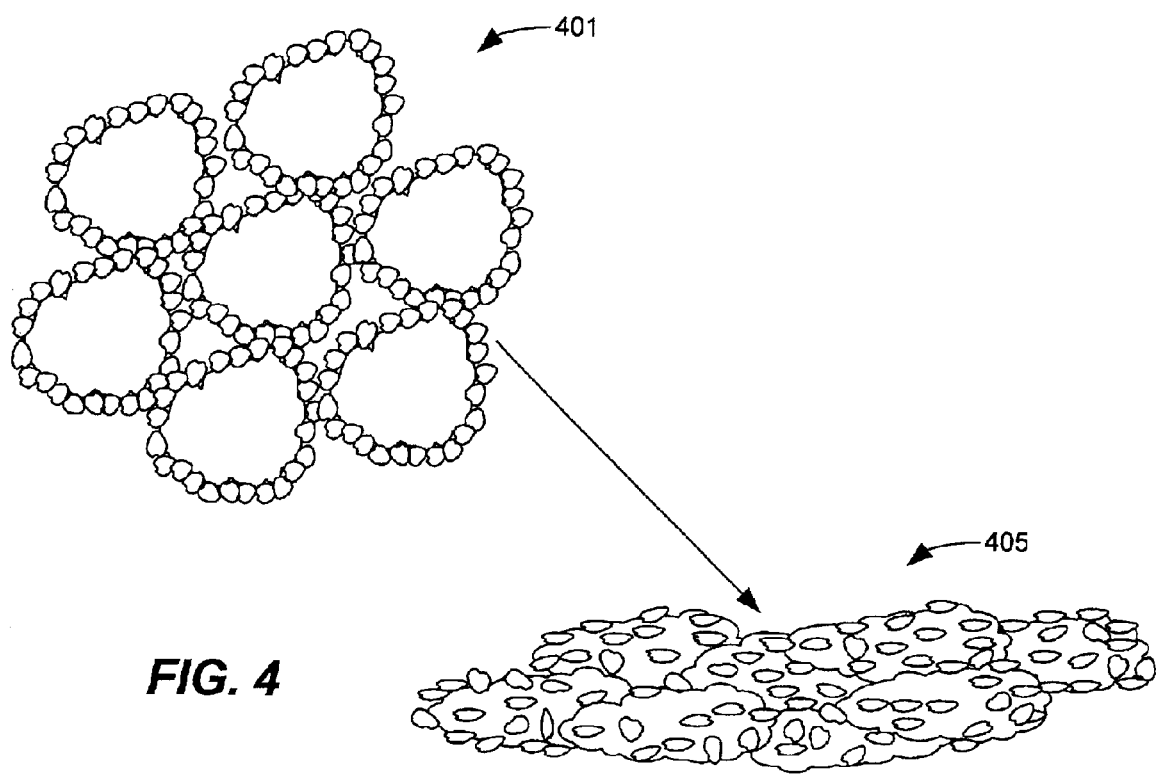
FIG. 4 illustrates production of useful materials from nanocomposite powders in accordance with the present invention.

FIG. 3 and FIG. 4 illustrate the nanocomposite production and manufactured product production processes described in FIG. 1 and FIG. 2. As generally shown in FIG. 3, fine powder particles 301, selected in operation 101, are processed with nanoscale powders 303, selected in operation 103, to form a nanocomposite 305. FIG. 3 illustrates an example nanocomposite particle 305 in cross-section in which the nanoparticles 303 substantially completely bond with the surface of fine powder particle 301. However, as noted earlier, the surface coverage degree and uniformity are a matter of design choice. Significantly, nanoparticles 303 form an energy favored bond with the surface of fine powder particle 301 so that, absent application of external energy, particles 303 will remain bonded with the particle 301.

In FIG. 4, once the nanocomposite powders 401 are selected in step 201, they may be post-processed (not shown), and formed into a consolidated structure 405 by various manufacturing means. The consolidated structure 405 may be formed in a manner that retains the surface bonding of nanoparticles 303 and fine powder particles 301. Alternatively, the manufacturing process may provide sufficient energy to break some or all of the bonds.

EXAMPLE 1

Dispersion Strengthening of Materials

Dispersion strengthening is a method to increase the strength of metal alloys by incorporating a fine distribution of hard particulates. This method takes advantage of the fact that dislocation motion is hindered by the presence of the fine particulate. This can be quantified by the following equation:

$$\tau = Gb/\lambda$$

where $\tau$=stress to force a dislocation through the particulate, G=shear modulus, b=Burger's vector, $\lambda$=spacing between particulate.

One of the primary variables in this equation (for a given chemistry) is the spacing between the particulate. This spacing can be reduced by decreasing the size of the particulate, giving a resultant increase in the shear strength for a given volume fraction of particulate. By decreasing the size of the particulate, the total mass and volume of particulate in the composite need not change. In this manner, valuable properties of the matrix material are expected to remain constant or be improved by decreasing the size of the particulate rather than being altered or compromised as might occur if the particulate loading were increased.

For example, 10 $\mu$m powders have a volume of about $5.24 \times 10^{-10}$ cc/particle (for spheres), while 100 nm powders have a volume of about $5.24 \times 10^{-16}$ cc/particle. Everything else remaining same and assuming uniform distribution, this represents a six order of magnitude difference in the number of reinforcing particles in a given volume of the composite. The increased dispersant concentration by number significantly decreases the inter-particle spacing ($\lambda$). By using 100 nm dispersant particles instead of 10 micron dispersant particles, the inter-particle spacing ($\lambda$) can be reduced by about 100 fold, which translates to a 100 fold enhancement in failure stress, $\tau$.

In order to improve the performance of the metals like copper and alloys like nickel aluminide, it is preferred that the nanoparticles be fused on the surface of the metal or alloy powder. This can be accomplished using Hosokawa Micron's Mechanochemical Bonding equipment. For example, 1 wt % of aluminum oxide nanoparticles can be mechanochemically bonded with 5 to 20 micron copper powders. Other weight loadings and different particle sizes can be utilized as appropriate. The resulting nano-engineered composite particles are ready to be used for oxide dispersion strengthened materials. It is anticipated that the uniform distribution and the interface bonding of the powders will significantly enhance the performance of the resulting material.

Alternatively, by using indium tin oxide or conductive nanoparticle dispersant, the electrical properties of the resulting oxide dispersion strengthened alloy can be enhanced. Similarly, by using magnetic compositions, additional functionality can be added to the dispersion strengthened metal or alloy. In yet other applications, the dispersant composition may be chosen to be one that is thermodynamically stable with the matrix at processing and use temperatures and environments. To illustrate, but not limit, the use of yttrium aluminum garnet instead of yttria in aluminum alloys can prevent the degradation of yttria strengthened aluminum alloy over time at high temperatures due to the reaction thermodynamically favored between yttria and aluminum.

EXAMPLE 2

Superior Performing Plastics

Mineral fillers are commonly used in plastics to lower cost or to enhance performance of the plastic. These mineral fillers are often nanoscale powders, submicron powders or fine powders (e.g., calcium carbonates, fumed silicas, carbon black, tale). Everything else remaining same, the shape, the size, and the concentration of mineral filler addition determines the performance the filler-filled plastic. However, an outstanding problem has been the ability to homogeneously distribute nanostructured or submicron mineral fillers as these fillers have tendencies to agglomerate. Another issue is the bonding of the filler interface to the polymer. These reasons, in part, have limited the commercially achieved performance of filled polymers.

To fully appreciate the relevance of nanotechnology to plastics, consider the constitutive equation for tensile strength of a polymer, $$\sigma_B \sim k(E\gamma/a)^{1/2}$$

where, k: geometric constant

E: Young's modulus of the material $\gamma$: fracture energy (not surface energy per unit area to account for plastic flow)

a: length of crack

This equation suggests that the tensile strength of a plastic is, in part, a function of the length of the naturally occurring cracks in a compounded plastic. As a rule of thumb, for compounded plastic powders of about 20 to 50 micron size, this naturally occurring crack length is usually between 1 to 10 microns. When a plastic fails, it is often because of stresses that concentrate around these cracks and grow the crack. The presence of fillers tends to pin these cracks and provide some limited improvement in the performance of the plastic.

Everything else remaining same, if plastic powders can be size-confined by a well-bonded mineral filler, the crack length can be confined to a domain size less than the plastic powder size. This can significantly enhance the tensile strength of the compounded plastic. Other mechanical properties can similarly be enhanced.

The superior performing plastic can be achieved as follows. Produce plastic powders of less than 5 microns, preferably less than 1 micron, more preferably 0.5 micron, and most preferably 100 nm in size. Coat (with good interface bonding) or mechano-chemically bond a nanoscale filler on the surface of this plastic powder by any technique thereby forming coated size-confined plastic powders. Ultimately, the present invention is used to produce a product from the coated size-confined plastic powder.

In another embodiment, a further step can comprise processing the coated size-confined plastic powders with additional plastic material to form a compounded plastic powder of a size suitable for injection molding. Such process can include agglomeration with uncoated plastic powders or ball milling or any other technique, and performed, for example, in post-processing operation 203 shown in FIG. 2.

Table 1 presents specific data on the benefits of nanoparticle enabled size-confined plastic powders in contrast with conventional polymers, metals and alloys.

TABLE 1

MECHANICAL PROPERTIES OF MATERIALS

| Material | Typical Tensile Strength (Yield, MPa) |
| --- | --- |
| 20–50 micron Polypropylene with naturally occurring crack length = 5 micron | 30 |
| Aluminum | 103 |
| Brass, Annealed | 250 |
| Bronze, Annealed | 270 |
| Nickel Superalloy | 276 |
| Low Carbon Steel | 285 |
| Stainless Steel | 290 |
| Nanoparticle size-confined Polypropylene with crack length confined to 500 nm | 95 |
| Nanoparticle size-confined Polypropylene with crack length confined to 100 nm | 212 |

Table 1 suggests that nanoparticle enabled size confinement can enhance the tensile strength of a plastic to a level where they may be able to compete with certain metals and alloys. Size-confined nanocomposite plastics become particularly attractive when the tensile strength exceeds 75 MPa. Given that plastics can be injection molded and formed by other techniques into net shape parts, this approach can significantly reduce the cost of making complex parts while delivering competitive structural performance. Plastics are lighter than metals and the consequent weight related savings could significantly enhance the system wide performance. Such enhanced plastics can be useful in automobiles, mobile consumer products such as laptops, phones and hand-held computers, architecture, and aircraft).

Additionally, size-confined plastic powders with enhanced mechanical properties can also reduce capital, operating, and labor costs associated with such tasks as post-machining, finishing, and others that are necessary when complex metal parts are being formed. The consequent reduction in environmental waste and the possibility of recycling or reuse further make such nanotechnology attractive. At the end of their useful life, such materials can also be used as precursors to make metal carbides and other inorganics through pyrolysis and related methods.

EXAMPLE 3

Superior Performing Ceramics, Metals and Alloys

As in example 2, nanoscale fillers can also be used with ceramics, metals and alloys to form superior performing materials. The constitutive equation presented in example 2 applies to other compositions of matter with the modification that many compositions do not experience plastic flow and therefore fracture energy has to be replaced with surface energy per unit area or other suitable quantity.

The superior performing ceramic or metal or alloy can be achieved as follows. Produce powders of desired composition of average size less than 50 microns, preferably less than 5 micron, more preferably 0.5 micron, and most preferably 100 nm in size. Coat (with good interface bonding) or fuse a nanoscale filler on the surface of this powder by any technique thereby forming coated size-confined powders with an average domain size of the confinement of less than 5 microns, preferably less than 1 micron, more preferably 0.5 micron, and most preferably 100 nm in size. Produce a product from the coated size-confined powder.

In another embodiment, a further step can comprise processing the coated size-confined powders with additional material to form a compounded powder of a size suitable for injection molding or other processing technique. Such process can include agglomeration with uncoated powders or ball milling or any other technique.

Compared with parts produced using 20+ micron powders of conventional metals, alloys, and ceramics, parts produced using size-confined materials prepared by the method outlined above can improve tensile strengths by greater than 25%. Other mechanical, magnetic, electrical, thermal, optical, and other properties of commonly available materials can similarly be improved by 25% or more.

Uses

This invention can be utilized to further improve the performance of known oxide dispersion strengthened alloys. These alloys are particularly desirable for engines, lighting parts, medical devices, x-ray imaging systems, cryogenic equipment, automotive parts, medical implants, nuclear industry, offshore piping, dental alloys, sporting goods, parts subject to high temperatures or corrosion, and environmental cleaning equipment.

Size-confined materials that can offer significantly improved performance are useful in wide range of new applications. Of particular interest are fuel cell system parts and micro-turbines given the importance of weight and costs for their wide spread commercial acceptance.

This invention can also be used where dissimilar materials need to be bonded. The filler, in such cases can be prepared with a composition of the dissimilar material thereby aiding the bonding process between matrix and the dissimilar material.

Further, this invention can be used to engineer other properties of materials, e.g., magnetic, electrical, electrochemical, optical, chemical, catalytic, and thermal. This can be achieved because of the fact that the bonding of another material on the surface of a submicron or nanoscale powder isolates the core particle. To illustrate but not limit, by coating magnetically soft nanoscale powders (less than 250 nm average size) on magnetically hard micron-scale powders (greater than 1 micron but less than 1000 microns), the nanocomposite produced is anticipated to exhibit unusual magnetic performance such as the hard magnetic domains that are functionally isolated from the other similar domains. Such materials are expected to be particularly useful in data storage, signal transmission, signal interception, intelligence gathering devices, and power conversion devices.

Similarly, by bonding electrically insulating nanoscale powder compositions on magnetic micron-scale powders, energy storage capacity can be increased while reducing losses due to eddy currents. In contrast, current technology using oxidized coatings to provide such insulation are limited to magnetic materials that oxidize readily, and can not independently control the insulator composition or thickness. In this manner, the present invention enables production of novel materials for electronic components and electrical and energy devices. It is expected that these devices and components can significantly reduce losses and/or improve energy efficiency and/or improve size to performance ratio and/or weight to performance ratios by at least by 5% when compared with equivalent devices and components prepared from uncoated micron-scale powders.

The use of appropriate composition on the surface can help engineer the surface contributed electrical properties of the composite particles. The disclosed materials can also be used for enabling electrical conductivity in materials used commercially at cryogenic or high temperatures or unusual environments or in materials processed at high temperatures to produce a product where the electrical conductivity is normally poor. Electrical conductivity can be achieved as follows: (a) provide a powder that meets the thermal, structural, and other performance requirements of the product, (b) coat the powder with nanoparticles of an electrically conducting substance such as metal or alloy or defect oxides or nitride or carbide or boride to achieve a nanocomposite form disclosed herein, (c) process the nanocomposite powders into a product. This method can enable multifunctional materials, i.e. products that provide structural function and provide one or more additional function. For example, aerospace parts can be produced with such multifunctional materials in order to provide structural support during routine use and provide a method for non-destructive testing of the parts' integrity during routine maintenance tests. If the part integrity is good, it is anticipated that the electrical conductivity of the part will not change. However, cracks and other incipient failures would change the electrical properties and therefore would be an easy way to detect incipient failure before the failure occurs.

Similarly, the use of appropriate composition on the surface can help engineer the surface contributed properties of the composite particles. The disclosed materials can also be used for targeted drug delivery and programmable drug delivery vehicles. Targeted drug delivery can be achieved as follows: (a) provide a magnetic powder that is physiologically acceptable, (b) coat the magnetic powder with the drug or a polymer containing the drug or a slow-release formulation of the drug in a composite particle form disclosed herein, (c) administer the drug orally, by injection, as skin cream, as fluid drops, using surgical procedures, or through inhalation, (d) apply electromagnetic field to concentrate the drug in the area of interest to deliver the drug in the area of interest.

Programmable drug delivery can be achieved as follows: (a) provide a fine powder, submicron powder or nanoscale powder with electromagnetic characteristics that is physiologically acceptable, (b) coat the powder with the drug or a polymer containing the drug or a slow-release formulation of the drug into a composite particle form disclosed herein, (c) if the drug diffuses rapidly, add a diffusion barrier coating that controls the diffusion rate to the preferred rate (d) administer the drug orally, by injection, as skin cream, as fluid drops, using surgical procedures, or through inhalation, (e) apply magnetic or electrical field to concentrate the drug in the area of interest to deliver the drug in the area of interest, (f) develop a program for preferred administration of the drug, (g) in accordance with this program, apply an electromagnetic field of sufficient intensity causing the electromagnetic powders to warm up and thereby thermally inducing increased drug diffusion and delivery rates. Such drug delivery procedures can be combined with blood or other body fluid monitors that monitor the administered drug or a resultant marker or a byproduct of the drug or a waste product of the drug to provide real time information to make the drug delivery administration program safer, cost effective, and more physiologically optimal.

Fine powders have numerous applications in industries such as, but not limiting to biomedical, pharmaceuticals, sensor, electronic, telecom, optics, electrical, photonic, thermal, piezo, magnetic, catalytic and electrochemical products.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of forming interface engineered material comprising:
    selecting a fine powder of a material of first composition;
    selecting nanoparticles of a second composition different an the first composition;
    chemically bonding the nanoparticles to the surface of the fine a powders thereby creating a nanocomposite powder with an interfacial layer on the fine powder surface. said interfacial layer of third composition distinct from the first composition and the second composition, and wherein the composition of said interfacial layer results from the chemical bonding of said nanoparticles of the second composition and the fine powders of the first composition.

2. The method of claim 1 further comprising a step wherein the nanocomposite powders are processed into a finished part.

3. The method of claim 1 wherein the nanoparticle loading is less than 5% by weight.

4. The method of claim 1 wherein the first composition is selected from the group consisting of: metal, alloy, an ceramic.

5. The method of claim 1 wherein the second composition is selected from the group consisting of: carbide, nitride, boride, chalcogenide, halide, metal, and alloy.

6. The method of claim 1 wherein the fine powder of first composition is a submicron powder.

7. The method of claim 1 wherein the fine powder of first composition is a nanoscale powder.

8. The method of claim 1 wherein the second composition is an oxide.

9. A nanocomposite powder comprising fine powders of first composition and nanoparticles of second composition, wherein the nanoparticles are chemically bonded to the fine powders there creating a nanocomposite powder with an interfacial layer on the fine powder surface, said interfacial layer of composition distinct from the first composition and the second composition, and wherein the composition of said interfacial layer results from the chemical bonding of said nanoparticles of the second composition and the fine powders of the first composition; and
    wherein the size-confined nanocomposite powder has an average domain size of less than 5 micron.

10. A product prepared from the nanocomposite powder of claim 9.

11. The nanocomposite powder claim 9 wherein the nanocomposite powder comprises at least one metal.

12. The nanocomposite powder of claim 9 wherein the nanocomposite powder comprises at least one polymer.

13. The nanocomposite powder of claim 9 wherein the nanocomposite powder comprises at least one ceramic.

14. The nanocomposite powder of claim 9 wherein the nanocomposite powder comprises at least one glass.

15. The nanocomposite powder of claim 9 wherein the nanocomposite powder comprises at least one biologically active substance.

16. The nanocomposite powder of claim 9 wherein the fine powders are magnetic and the nanoparticles are electrically insulating.

17. The nanocomposite powder of claim 9 wherein the nanoparticles comprise an electrically conducting substance.

18. The nanocomposite powder of claim 9 wherein the fine powders are submicron powders.

19. The nanocomposite powder claim 9 wherein the fine powders are nanoparticles.

20. The nanocomposite powder of claim 9 wherein the nanocomposite powder comprises powder with aspect ratio greater than one and less than 1,000,000.

* * * * *